(12) United States Patent
Tompkin et al.

(10) Patent No.: US 6,602,578 B1
(45) Date of Patent: Aug. 5, 2003

(54) DECORATIVE FOIL

(75) Inventors: Wayne Robert Tompkin, Baden (CH); René Staub, Cham (CH)

(73) Assignee: OVD Kinegram AG, Zug (CH)

( * ) Notice: Subject to any disclaimer, the term of this patent is extended or adjusted under 35 U.S.C. 154(b) by 0 days.

(21) Appl. No.: 09/937,972

(22) PCT Filed: Apr. 4, 2000

(86) PCT No.: PCT/EP00/02986

§ 371 (c)(1),
(2), (4) Date: Oct. 1, 2001

(87) PCT Pub. No.: WO00/61386

PCT Pub. Date: Oct. 19, 2000

(30) Foreign Application Priority Data

Apr. 9, 1999 (DE) .......................................... 199 15 943

(51) Int. Cl.⁷ .......................... B32B 3/00; A47G 35/00; B42D 15/00
(52) U.S. Cl. .................... 428/156; 428/172; 428/542.2; 428/913.3; 283/72; 283/107
(58) Field of Search ............... 428/156, 172, 428/145, 209, 542.2, 913.3; 283/72, 107

(56) References Cited

U.S. PATENT DOCUMENTS

| | | | |
|---|---|---|---|
| 3,338,730 A | 8/1967 | Slade et al. | |
| 4,484,970 A | * 11/1984 | Burzlaff et al. | 156/233 |
| 4,857,401 A | * 8/1989 | Sieverding | 428/913 |
| 5,056,880 A | 10/1991 | Barbanell | |
| 5,529,828 A | 6/1996 | Patel et al. | |
| 5,746,865 A | 5/1998 | Stepanek | |
| 5,772,248 A | 6/1998 | Phillips | |
| 6,254,712 B1 | * 7/2001 | Enlow et al. | 427/209 |

FOREIGN PATENT DOCUMENTS

| | | |
|---|---|---|
| AU | B-89383/91 | 6/1992 |
| CH | 653 782 | 1/1986 |
| DE | 1 130334 | 5/1962 |
| DE | 228 669 | 10/1985 |
| DE | 4025296 | 2/1991 |
| DE | 42 00 746 | 7/1993 |
| DE | 43 13 521 | 6/1994 |
| DE | 297 00 289 | 8/1997 |
| EP | 0 123 163 | 10/1984 |
| EP | 0 132 668 | 2/1985 |
| EP | 0 105 099 | 1/1986 |
| EP | 0 209 362 | 1/1987 |
| EP | 0 883 085 | 12/1998 |
| FR | 2 697 808 | 5/1994 |
| JP | 63247784 | 10/1988 |
| JP | 09220892 | 8/1997 |
| WO | WO 82/03202 | 9/1982 |
| WO | WO 96/01458 | 1/1996 |
| WO | WO 97/04339 | 2/1997 |
| WO | WO 99/10163 | 3/1999 |

* cited by examiner

Primary Examiner—Donald J. Loney
(74) Attorney, Agent, or Firm—Hoffman & Baron, LLP

(57) ABSTRACT

A decorative foil (1) has a laminate structure comprising at least two layers (2; 3). The layers (2; 3) include a for example transparent base foil (2) which is coated on side with a reflection layer (3). A protective layer (4) can protect the reflection layer (3) from external influences. The shaping surface (7) of the base foil (2), which is towards the reflection layer (3), has a structure, obtained by shaping, of groups of geometrical shapes. An area occupied by the group is of width of between 30 $\mu$m and 300 $\mu$m. Elements (14) of the group, which are shaped in the base foil (2), are of a substantially rectangular cross-section, wherein the surface occupied by the group is composed of element surfaces (9 through 11) which are in a parallel plane (8) with respect to the shaping surface (7) and residual surfaces (13) which have remained in the plane of the shaping surface (7). The surfaces occupied by the groups are separated by regions of a background area in the plane of the shaping surface (7).

22 Claims, 5 Drawing Sheets

DECORATIVE FOIL

BACKGROUND OF THE INVENTION

This application claims priority based on an International Application filed under the Patent Cooperation Treaty, PCT/EP00/02986, filed on Apr. 4, 2000, and German Patent Application No. 199 15 943.2, filed on Apr. 9, 1999.

The invention relates to a decorative foil as set forth in the classifying portion of claim 1.

Such decorative foils have a mirror-equaling reflecting surface and are used for the decorative packaging of products and/or for safeguarding the products from pirate copies if, for aesthetic reasons or cost reasons, no security elements such as colored holograms, mosaics with diffraction gratings etc., are used.

A decorative foil of the kind set forth in the opening part of this specification is known from WO 82/03202. A paper carrier is plastic-coated on one side in order to smooth the one surface. The smooth surface is then metalized by the vapor deposition of aluminum in such a way that the plastic layer is enclosed between the metal layer and the paper. That decorative foil can be processed like paper, and it is of a metallic appearance on the one outward side. The metallic outward side can additionally be printed upon.

EP 0 209 362 A2 describes a decorative foil in which firstly the metal layer is applied on both sides of a plastic foil, wherein the one side has a mirror-smooth surface and the other side has a matt surface. The highly reflective or the matt surface of the plastic foil is laminated onto paper. An additional lacquer coating applied over the free metal layer provides for an enhanced resistance to abrasion of the metal layer. The decorative foil can be processed like paper and printed upon on the metal side.

It is also known for documents such as value-bearing papers or securities or bonds, tickets, bank notes and so forth to be provided with strips or rhombuses of a metalized hot stamping foil so that a photocopy of the document can be clearly detected as a copy by virtue of under-illumination in the region of the metalized hot stamping foil.

Those decorative foils with a mirror finish are readily available on the market and do not carry any feature referring to the manufacturer of the product.

In addition EP 0 132 668 B1 mentions papers which are laminated with metal foil or covered with very fine metal flakes and which can also have an embossing. By virtue of their suitability for being cut and folded at high speed, such metalized papers are used for example in the cigarette industry as a packaging material.

Relief structures in ink or metal paste are applied to the substrate on bank notes or passes by means of intaglio printing, as is known for example from DD 228 669 A5. It is only under a predetermined condition in terms of viewing that it is possible to recognize a latent image produced by the relief structures. U.S. Pat. No. 5,772,248 teaches embossing into a foil such a latent image which is visible with the naked eye.

SUMMARY OF THE INVENTION

The object of the invention is to provide a high-quality, inexpensive decorative foil which has a mirror-equaling reflecting property and inconspicuous authenticity features which are difficult to copy.

In accordance with the invention the specified object is attained by the features recited in the characterizing portion of claim 1. Advantageous configurations of the invention are set forth in the appendant claims.

The decorative foil comprises at least two layers, a base foil coated on one side with a reflection layer. The reflection layer however is advantageously arranged between the base foil and a protective layer. A shaping surface of the base foil, which faces towards the reflection layer, has a structure, obtained by shaping, of groups of geometrical forms. A surface occupied by the group is of a width of between 30 $\mu$m and 300 $\mu$m. Elements of the group, which are shaped in the base foil, are of a substantially rectangularly shaped cross-section, wherein the surface occupied by the group is composed of element surfaces which are disposed in a parallel plane with respect to the shaping surface, and residual surfaces in the plane of the shaping surface. The surfaces occupied by the groups are separated by regions of a background area in the plane of the shaping surface.

BRIEF DESCRIPTION OF THE DRAWINGS

Embodiments of the invention are descried in greater detail hereinafter and illustrated in the drawing in which.

DESCRIPTION OF THE PREFERRED EMBODIMENTS

Figure 1:
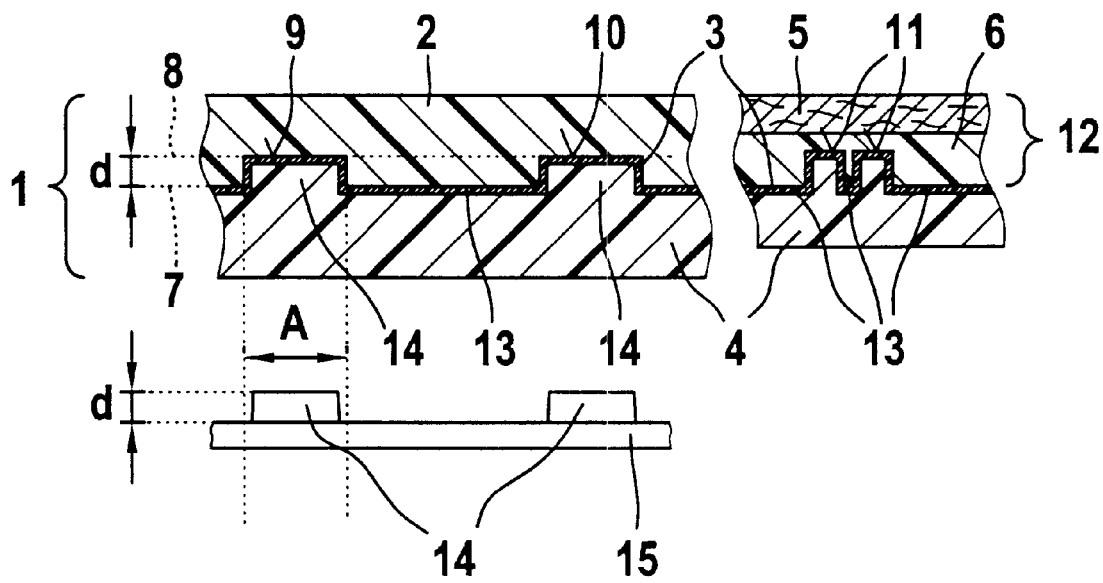
FIG. 1 is a view in section of a die and two embodiments of a decorative foil.

FIG. 1 reference 1 denotes a decorative foil, 2 a base foil, 3 a reflection layer, 4 a protective layer, 5 a base layer, 6 a shaping layer, 7 a shaping surface of the base foil 2 and 8 a parallel plane with respect to the shaping surface 7, and 9 through 11 element surfaces which are in the parallel plane 8. The reflection layer 3 is applied to the shaping surface 7. The two embodiments of the decorative foil 1, which are shown in FIG. 1, differ in respect of the base foil 2; the embodiment at the left is provided with a solid base foil 2 while in the case of the embodiment on the right the base foil 2 is a laminate 12 which is formed from the base layer 5, the shaping layer 6 and optionally present layers (not shown here) between the base layer 5 and the shaping layer 6. The reflection layer 3 is shown in FIG. 1 only at the left of the drawing as a "layer", by means of a double line, while at the right in the drawing and hereinafter it is only shown as a bold line. The shaping surface 7 of the base foil 2 is structured by a shaping procedure by elements 14 of a die 15 in such a way that the elements 14 cause local parts of the reflection layer 3 with the shaping surface 7 to be displaced in the form of element surfaces 9 through 11 by a practically equal distance d into the parallel plane 8. The structure produced by shaping of the elements 14 in the base foil 2 (or in the laminate 12) has depressions for example of a substantially rectangular cross-section. In a first embodiment the surfaces of the die 15 which come into contact with the reflection layer 3 are polished. The dimensions A of the element surfaces 9 through 11 are between 250 nm and 300 μm, that is to say, it is possible to produce shaping configurations with a resolution of 4,000 dots/mm or 100,000 dpi. The features of the decorative foil 1 are raised portions in the form of cylinders, prisms, truncated cones, truncated pyramids and so forth with the element surfaces 9 through 11 as top surfaces. The element surfaces 9 through 11 have as their boundary the contours of geometrical shapes such as letters, digits, graphical characters, logos and so forth and are produced in the form of raised portions above the shaping surface 7, for example in the form of a text.

The structured reflection layer 3 which is fractions of a micrometer thick is preferably coated with the protective layer 4 so that the reflection layer 3 is arranged between the base foil 2 and the protective layer 4 and protected from external influences. The reflection layer 3 is visible through the base foil 2 and/or through the protective layer 4. It appears as a metallically shiny, mirror surface if the material of the reflection layer 3 is a metal (Al, Ag, Au, Cr, Cu, Fe, Ni, Pd, Ti and so forth). If in contrast the reflection layer 3 comprises a transparent dielectric ($TiO_2$, ZnS, ZnO, $Nd_2O_3$ and so forth) with a refractive index of greater than 1.8 for light in the visible range, the decorative foil 1 is generally transparent if the base foil 2 and the protective layer 4 are transparent.

However, surface portions of the decorative foil 1, in which the light incident on the surface portions and the viewing direction precisely satisfy the reflection condition shine like a mirror; that produces a particularly decorative effect. The structure formed in the reflection layer 3 can be seen in full detail only by means of a strong magnifying glass. Both the element surfaces 9 through 11 and also residual surfaces 13 between the heightwise-displaced element surfaces 9 through 11 appear uniformly light to the person viewing them, but reflecting side surfaces of the structures do not satisfy the same viewing conditions as the element surfaces 9 through 11 and the residual surfaces 13 and therefore appear as a different brightness value from the element surfaces 9 through 11 and the residual surfaces 13. In addition scatter effects occur at the edges of the element surfaces 9 through 11 so that the contours of the element surfaces 9 through 11 are so clearly emphasized in relation to the element surfaces 9 through 11 and the residual surfaces 13 that information afforded by the structure (text, graphics, emblem, trademark and so forth) can be seen.

The packaging with the decorative foil 1 is advantageous for sealed-in, expensive or high-value products as the structure in the decorative foil 1 used for the packaging provides an indication of the authenticity of the original product, an examination which can be carried out at any time and anywhere without breaking the seal. From the point of view of the purchaser or the vendor, that packaging reduces the risk of unknowingly acquiring or offering a pirate copy. The slight increase in expenditure on the packaging moreover protects the manufacturer of the original products from financial damage due to pirate copies.

The base foil 2 is either a solid thermoplastic foil or a laminate 12 comprising at least two layers, for example the base layer 5 and a thermoplastic shaping layer 6 which is fixedly connected to the base layer 5. The base layer 5 comprises for example a thermoplastic foil or a paper. The shaping layer 6 is applied in the form of a lacquer to the base layer 5 or laminated onto the base layer 5, as a thermoplastic foil. Primer layers can be provided between the base layer 5 and the shaping layer 6 in order to prevent the laminate 12 from splitting. The base foil 2 is preferably transparent if the base foil 2 forms the outward side of the decorative layer 1, in which respect it can be colorless ("clear as glass") or colored. If the protective layer 4 is transparent and forms the outward side of the decorative foil 1 the base foil 2 can be opaque or completely non-transparent.

Figure 2:
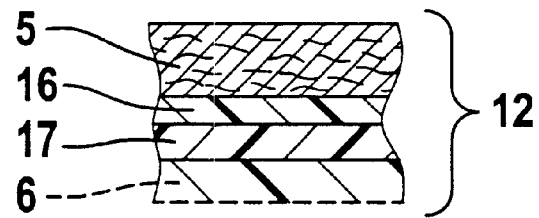
FIG. 2 shows a laminate.

FIG. 2 shows the laminate 12 which is known from abovementioned WO 82/03202 and which has a paper as a base layer 5. The base layer 5 comprises cardboard or paper, referred to hereinafter as "paper", to which are applied on one side optionally present priming intermediate layers 16 and a polymer layer 17 (polyolefins, polyesters, PVC and so forth), in the specified sequence. The polymer layer 17 can be used directly instead of the shaping layer 6 for shaping from the die 15 (FIG. 1). In another embodiment, in addition to the polymer layer 17, the shaping layer 6 shown in broken line in FIG. 2 can be applied to the polymer layer 17. The decorative foils 1 based on the laminate 12 with the base layer 5 of paper are used predominantly in the packaging industry as this special decorative foil 1 has the advantage that it can be processed like paper, that is to say at high speed. If the paper is of cardboard quality the decorative foil 1 can be used for example for the production of decorative boxes. The decorative foil 1 with a thin paper (square meter weights in the range of between 17 $g/m^2$ and 80 $g/m^2$) serves for example as a decorative lining for a box and so forth.

The thermoplastic foil for the base foil 2 (FIG. 1) or for the base layer 5 advantageously comprises polyester (polyethylene terephthalate (PETP) or polycarbonate (PC)) or polyolefins (polyethylenes (PE), polypropylene (PP) and so forth) or another plastic material suitable for foil production. In particular the polyester foils are clear as glass without coloration and even in thin thicknesses afford a high level of tensile strength as is required for packaging material. Coloring of the plastic material produces partial transparency of the foil for a limited part of the visible spectrum; it is transparent in respect of a decorative (for example red) color. According to the use of the decorative foil 1 the thickness of the thermoplastic foil is of a value in the range of between some micrometers and some millimeters, but preferably between 5 μm and 100 μm.

The optionally present shaping layer 6 is usually applied in the form of a lacquer. Transparent lacquers on a nitrocellulose and/or acrylate base (for example polymethylmethacrylate, PMMA) or one of the UV-hardening lacquers have proven successful. However the shaping layer 6 can also be laminated in the form of a thin foil of polyvinyl chloride (PVC), PETP, PC, PE or PP, onto the base layer 5. The thickness of the unshaped shaping layer 6 attains at least the distance d, preferably the shaping layer 6 is to be applied thicker by some micrometers so that the structure is contained entirely in the shaping layer 6.

Figure 3:
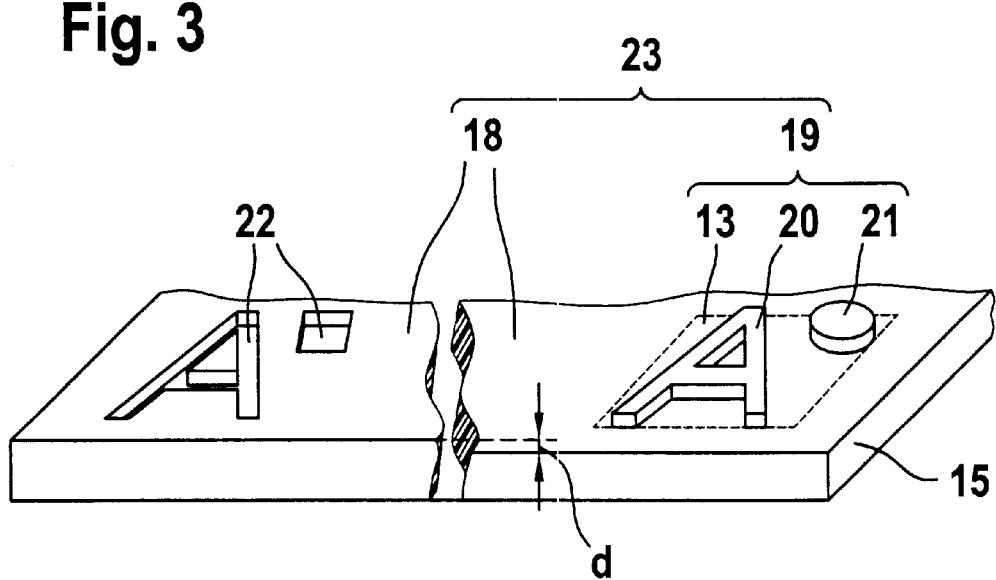
FIG. 3 shows a section of a die with structures of geometrical shapes.

In accordance with EP 0 386 316 A1 relief structures are shaped in a band-shaped foil between a roller die and the counter-pressure backing roller in a continuously operating procedure. Drawn onto the roller die is a die sleeve which on its outside peripheral surface has a negative of the structure to be shaped. FIG. 3 shows a section from the peripheral surface, the die 15, of the die sleeve. The peripheral surface has surface structures comprising the for example regularly arranged groupings of the elements 14 (FIG. 1). Arranged between the groupings are areas 18 which are free of the elements 14. The peripheral surface is thus composed of the surfaces of the background, which are occupied by the areas 18, and group surfaces 19, wherein the group surface 19 is formed from the residual surfaces 13 and stamp surfaces 20 through 22 of the elements 14. The surfaces of the areas 18 and the residual surfaces 13 form the die surface 23 which determines the plane of the shaping surface 7. The stamp surfaces 20 through 22 together form a surface proportion which at less than 20% of the peripheral surface is smaller than the surface proportion of the die surface 23 on the peripheral surface. The surface structures of the die 15 can be raised or recessed; for example the embodiment at the right has raised stamp surfaces 20 and 21 above the die surface 23 while in the embodiment on the left the stamp surfaces are recesses in the die surface 23. The stamp surfaces 20 and 21 are displaced for example by the one distance d and the stamp surfaces 22 are displaced by another distance d with respect to the die surface 23 and by virtue of the shaping effect of the elements 14 in the base foil 2 (FIG. 1) or the laminate 12 (FIG. 2) produce recesses of substantially rectangular cross-section. Affording the advantage of a better shaping effect, the elements taper somewhat towards the stamp surfaces 20 through 22 so that the recesses are of a trapezoidal cross-section. The element surfaces 9 (FIG. 1) through 11 (FIG. 1) and the residual surfaces 13 (FIG. 1), after shaping in the base foil 2, have the very fine structures of the stamp surfaces 20 through 22 and the die surface 23.

A widespread process for shaping the structures of the die 15 in the thermoplastic foil is stamping or embossing with the heated die 15. The die 15 heats the surface of the thermoplastic foil in such a way that the elements 14 penetrate into the surface of the foil and displace the element surfaces 9 through 11 of the elements 14 into the parallel plane 8 (FIG. 1) by the distance d. The distance d is of a value in the range of between 0.05 $\mu$m and 10 $\mu$m. Preferred values for d are between 0.1 $\mu$m and 2 $\mu$m. Another process involves shaping the structure of the die 15 in the surface of a hardening lacquer which was caused to harden by means of UV-radiation. In that process the reflection layer 3 (FIG. 1) is applied after the operation of shaping the structure by means of the die 15.

Figure 4:
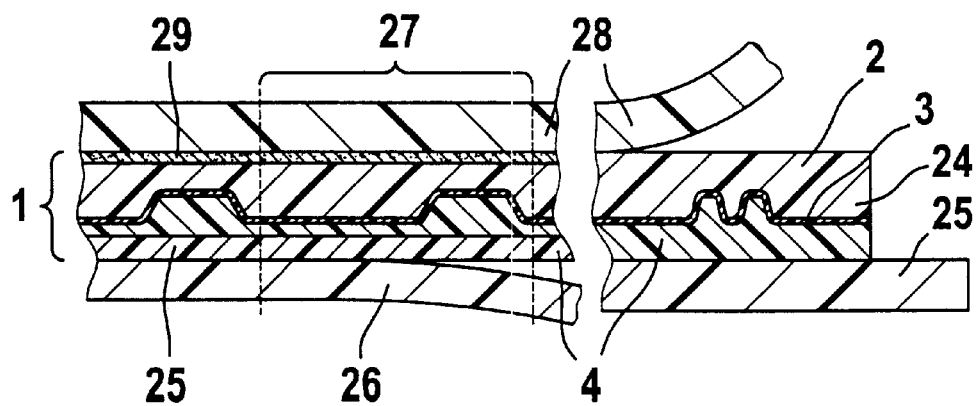
FIG. 4 shows a view in section of another embodiment of the decorative foil.

As FIG. 4 shows the protective layer 4 covers the structured reflection layer 3. The protective layer 4 is applied in the form of an easily flowing lacquer on a nitrocellulose and/or acrylate base, in one or more layers. The recesses in the base foil 2 are completely filled up and leveled out. The layer thickness, measured above the plane of the shaping surface 7, is of a value in the range of between 0.5 $\mu$m and 10 $\mu$m. The shaped structures are completely covered with the protective layer 4 in order to prevent direct access to the shaping surface 7 which is now structured. If the protective layer 4 over the reflection layer 3 is to be particularly scratch-resistant, the recommendation is to use one of the lacquers which harden by means of ultraviolet radiation and which are employed for the protection of heavily stressed surfaces in relation to credit cards, identity cards, IC-cards and so forth.

In the embodiment at the left in FIG. 4 the structure which is shaped in the base foil 2 has recesses of a trapezoidal cross-section. The condition in respect of viewing of such a structure is less limited than in the case of structures of rectangular cross-section. In the case of very fine structures, for example a double line in the embodiment, at the right, the rectangular cross-sections cannot be cleanly shaped and may have edges which are rounded-off in cross-section.

If the decorative foil 1 is to be connected to a substrate 24, the protective layer 4 is adapted for connection to the substrate 24, either an additional adhesive layer 25 is applied to the surface of the protective layer 4, which is remote from the reflection layer 3 (embodiment on the left) or the material of the protective layer 4 is suitable itself for connection to the substrate 24 (embodiment on the right). Both cold adhesives, for example rubber-based adhesives, and also hot adhesives, are known for that use. The hot adhesives develop their adhesive properties only at elevated temperature, for example a polymethylmethacrylate-based hot adhesive from about 110° C. The thickness of the adhesive layer 25 or the adherable protective layer 4 is dependent on the surface roughness of the substrate 24 and the nature of the adhesive material. The cold adhesive is of a thickness of about 10 $\mu$m for a smooth surface of the substrate 24 to 30 $\mu$m for a rough substrate surface. In regard to the thickness of the hot adhesive material about 1 $\mu$m is sufficient for a smooth surface of the substrate 24, to 10 $\mu$m for a rough substrate surface. The adhesive layer 25 or the adherable protective layer 4 on the basis of a cold adhesive is covered with an easily removable protective foil 26 of polyester or siliconized paper in order to avoid the decorative foil 1 from sticking when that is not wanted. The protective foil 26 is pulled off before the decorative foil 1 is applied to the substrate 24.

The decorative foil 1 can be cut into narrow strips or tags 27 of a few square centimeters, as is indicated in FIG. 4 by interrupted lines. A transfer band 28 facilitates application of the tags 27 and is arranged on the side of the base foil 2, which is remote from the reflection layer 3. The connection of the transfer band 28 to the base foil 2 is made by way of a separating layer 29, for example of a wax, and can be easily removed after the tag 27 has been stuck on to the substrate 24. Manufacture of the decorative foils 1 is based on the base foil 2 connected to the transfer band 28. After application of the last layer, that is to say the adhesive layer 25 or the adherable protective layer 4 or the protective foil 26, the tags 27 are stamped out of the decorative foil 1 from the last layer towards the transfer band 28 without cutting through same ("kiss-cut"). After the tag 27 is stuck onto the substrate 24 the transfer band 28 is pulled off (FIG. 4, right-hand side). Documents, bank notes, passes of all kinds and so forth, by means of such a tag 27, acquire simple protection from photocopying and at the same time the structure in the decorative foil 1 forms a feature of the tag 27, which is easy to check.

Figure 5:
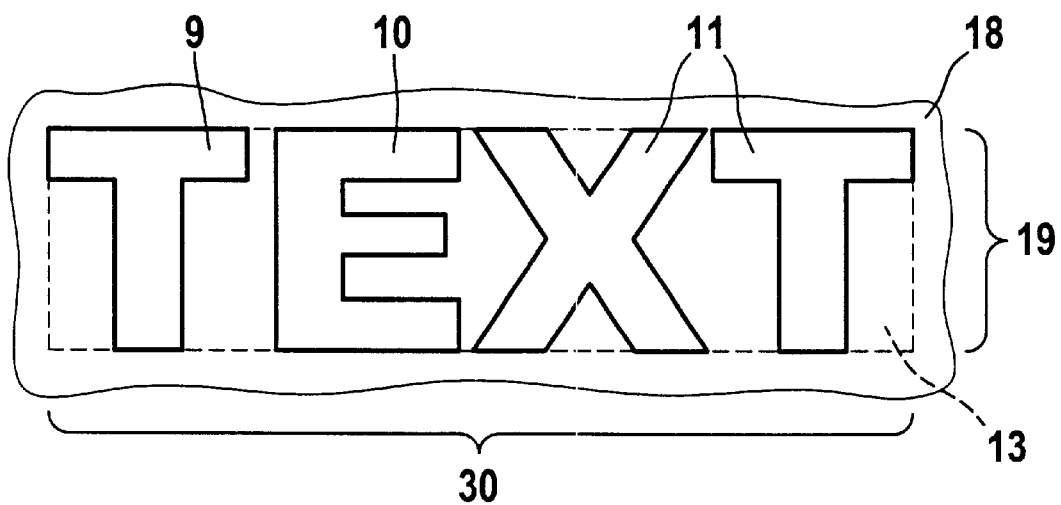
FIG. 5 shows a group of geometrical shapes.

FIG. 5 is a plan view of a section of the decorative foil 1 with a group 30 of the element surfaces 9 through 11 and the residual surfaces 13 within the group surface 19. The group surface 19 is a notional rectangle which is used for description purposes and which with each side touches at least one of the element surfaces 9 through 11. The group surface 19 is surrounded by the areas 18 which separate the groups 30 from each other. The element surfaces 9 through 11 of a group 30 are in the parallel plane 8 (FIG. 1) and are displaced from the shaping plane 7 (FIG. 1) by the distance d associated with the group. In the event of incident light, scatter effects occur at the edges of the element surfaces 9 through 11 so that the contours of the element surfaces 9 through 11 can be detected with the magnification device as a difference in contrast in relation to the surroundings. If the element surfaces 9 through 11, the residual surfaces 13 and the areas 18 are reflective, then in the view in FIG. 5 the edges of the letters, which are emphasized in black, correspond to the contours which are accentuated by differences in contrast. The detectability of the element surfaces 9 through 11 is increased by the choice of trapezoidal cross-section of the structures, as is shown in FIG. 4, or by means of double edges delimiting the structures. When viewed with the naked eye, the decorative foil 1 is metallically shiny and cannot be distinguished from an unstructured metalized foil. The dimensions of the group surface 19 which are shown by way of example in the drawing of FIG. 5 are about 340 $\mu$m in length and 75 $\mu$m in width, with the line width for the element surfaces 9 through 11 being assumed to be 15 μm. So that the information "TEXT" is clearly readable the dimensions of the group surface 19 are to be suitably selected having regard to the magnification device prescribed for checking the decorative foil 1, in which respect the predetermined magnification is to be at least 10. As the viewing distance when using a magnifying glass is less than the usual 30 cm, so-called "micro-marking" with letters, characters and so forth of between 30 μm and 300 μm in height can be clearly recognized.

Figure 6:
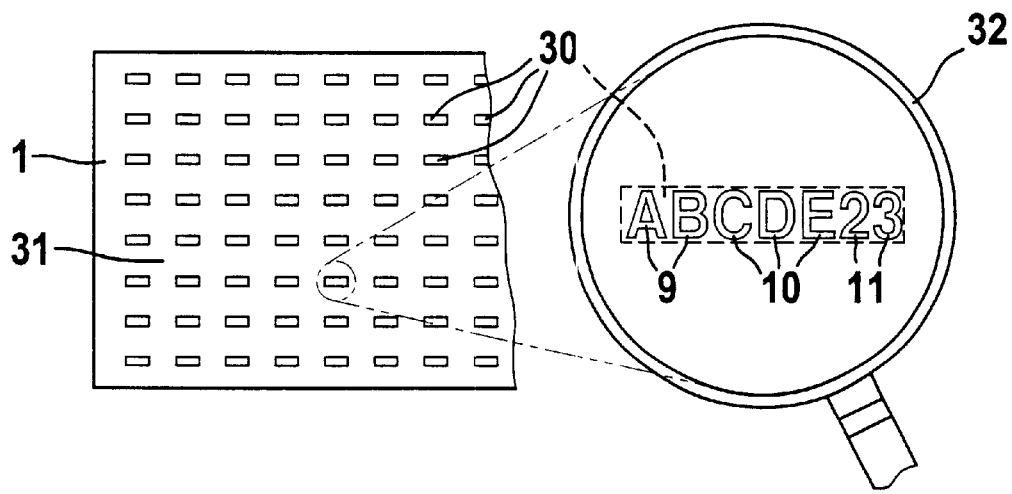
FIG. 6 shows a regular arrangement of the groups.

FIG. 6 shows a portion of the decorative foil 1. The groups 30 are arranged at regular spacings on the entire surface of the decorative foil 1 and separated by regions of surfaces which are not occupied by the groups 30, being a background area 31. One of the groups 30 is shown as being viewed through a magnifying glass 32. The contours of the element surfaces 9 through 11 are visible under the strong magnification. The density of the groups 30 on the decorative foil 1 depends on the use and the length of the group 30. The proportion of the element surfaces 9 through 11 to the area of the decorative foil 1 is less than 20%, preferably between 1% and 10%.

Optically variable diffraction patterns are known, in the form of a hologram and in KINEGRAM-technology, in accordance with EP 0 105 099 B1. The diffraction patterns often have reflecting surfaces. As an additional security feature, instead of reflecting surfaces, they have surface portions with the pattern of the groups 30 and the background area 31.

Figure 7:
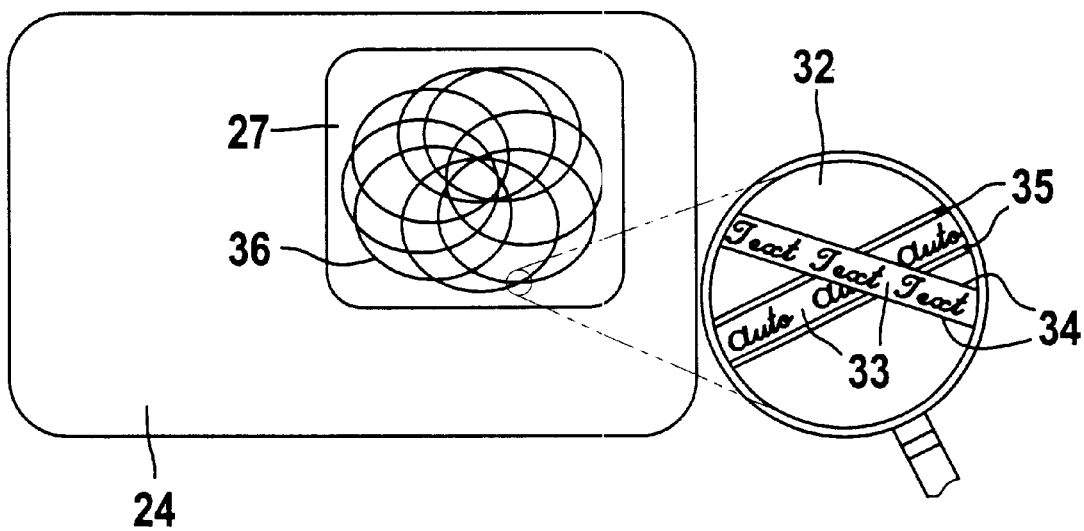
FIG. 7 shows a pattern of band-shaped strips with the groups.

In the embodiment shown in FIG. 7 the groups 30 are arranged in rows in text bands 33. For the purposes of further decoration the text bands 33 are edged with narrow lines 34 or double lines 35 of line widths in the region of 0.05 mm or less. For example the surfaces of the lines 34 or the double lines 35 are occupied with diffraction gratings and implemented using the KINEGRAM-technology. The combination of those two different technologies produces on a tag 27 an optically variable guilloche pattern 36 which is visible with the naked eye, of a diameter of the order of magnitude of centimeters and with information which can only be recognized upon being viewed through the magnifying glass 32. That tag 27 is suitable by virtue of the mirror effect as an anti-copying measure and is glued as an authenticity feature onto the substrate 24 (document, pass, card and so forth).

Figure 8:
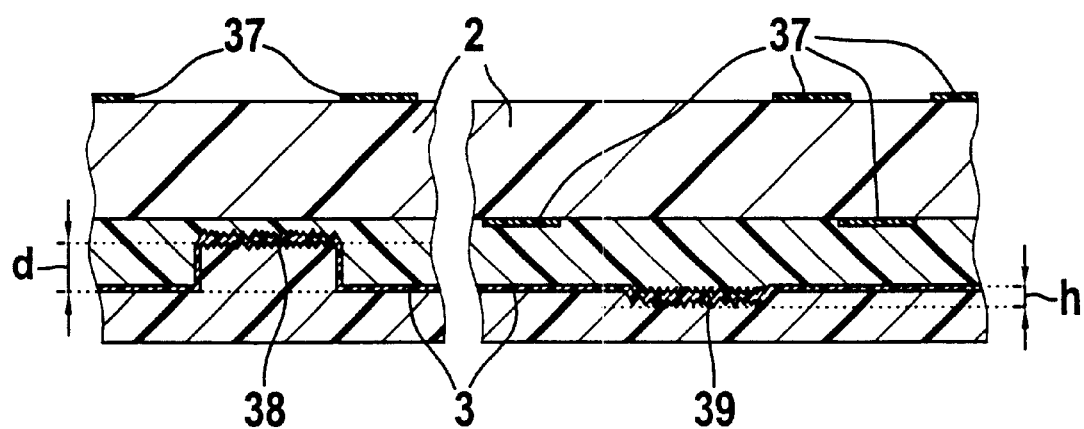
FIG. 8 shows the decorative foil with indicia.

FIG. 8 shows embodiments of the decorative foil 1 with indicia 37 which are additionally printed on the base foil 2 (text, images, emblems and so forth). The one embodiment, on the left, has the indicia 37 only on the outward side of the base foil 2, which is remote from the reflection layer 3, while the other embodiment, on the right, has indicia 37 on both sides of the base foil 2. Printing items of information or references on the base foil 2 on at least one of the two sides thereof can provide a contribution in regard to indications of origin or in regard to the artistic configuration of the decorative foil 1. The indicia 37 are protected from abrasion if they are printed on the inward side of the base foil 2, which is towards the reflection layer 3.

The structure of the decorative foil 1 shown in FIG. 8 requires for the shaping procedure a die 15 (FIG. 3) whose stamp surfaces 20 (FIG. 3) through 22 (FIG. 3) and/or die surface 23 (FIG. 3), instead of a mirror-smooth surface, have a microscopically fine relief structure 38 and 39 respectively which in the shaping procedure is transferred onto the element surfaces 9 through 11 and onto the background surface 31 respectively. Isotropic or anisotropic matt structures or a kinoform structure known from Swiss patent specification No 653 782 can be used as the relief structure 31. The element surfaces 9 through 11 (FIG. 1) have the same relief structure 38 at least within a group 30 (FIG. 6). The adjacent groups 30 can differ by virtue of relief structures 38 which are oriented in different ways so that a first micromarking can be seen in the one direction and a second micromarking is to be read after rotation of the decorative foil 1, in another direction. The differences in height within the relief structure 38 and 39 respectively are in the range of between 10 nm and 5,000 nm.

The isotropic matt structures scatter the incident light independently of the direction of incidence thereof uniformly into the entire half-space by way of the matt structure (=isotropic). One surface of the decorative foil 1 which is occupied with the isotropic matt structure has a matt shine of low light intensity. The anisotropic matt structure is of a matt appearance in one orientation in relation to the incident light; in another orientation, after the matt structure has been turned about an axis which is perpendicular to the plane of the decorative foil 1, the matt structure shines, but this shine is markedly weaker than the light intensity of the adjoining reflective surface. The element surfaces 9 of an entire group 30 have the same matt structure. The adjacent groups 30 can differ by anisotropic matt structures involving different orientations. In that way in the one direction the first micromarking can be detected with a high level of contrast and the second micromarking can be detected with a low level of contrast in relation to the background area 31 (FIG. 6) and in the other direction the first micromarking has the low contrast and the second micromarking the high contrast.

The die surface 23 or the stamp surfaces 20 through 22 may also contain concealed information and for that purpose are provided with a particular relief structure 39 and are used in combination with the mirror surface for the stamp surfaces 20 through 22 or for the die surface 23 for shaping of the structure of the decorative foil 1. This relief structure which is shaped in the base foil 2 provides for scattering of incident incoherent light with normal illumination in a similar manner to a matt structure so that, when viewed with the magnifying glass 32 (FIG. 7), the element surfaces 9 through 11 appear either as reflective surfaces in the metallically matt background area 31 or as mattly gleaming metallic surfaces in the reflective background area 31.

Figure 9:
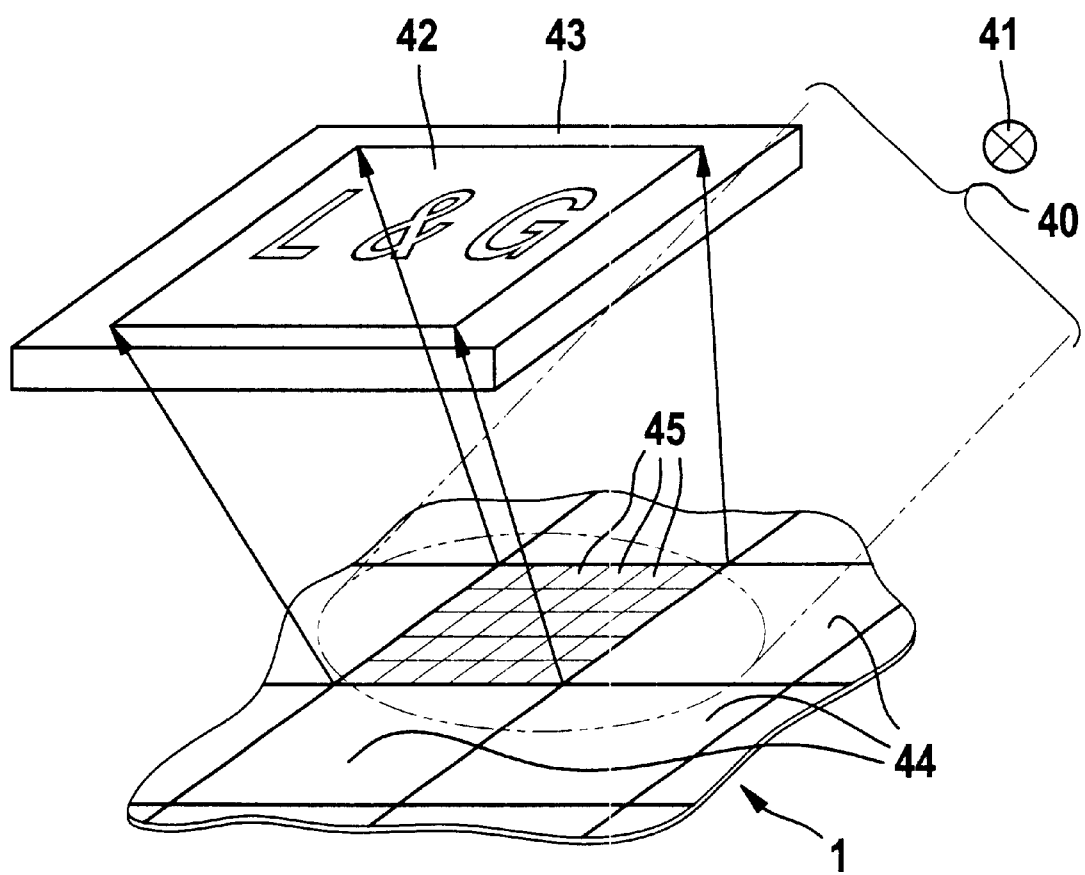
FIG. 9 shows an illuminated kinoform.

FIG. 9 shows a section of the decorative foil 1 with the particular relief structure 39 (FIG. 8). Upon illumination with a parallel coherent light beam 40 from a laser diode or a laser 41 the particular relief structure 39 deflects the incident coherent light in such a way that the deflected light projects a further item of concealed information, here the logo 42 with the letters "L & G" onto a screen 43 arranged above the decorative foil 1. A representative of these particular relief structures 39 is the kinoform, a computer-generated hologram. The concealed information is reconstructed in the coherent light, irrespective of which location of the kinoform is illuminated or how large the illuminated area is, but the image quality of the protected information deteriorates, the smaller the illuminated area is. This behavior is also known in relation to Fourier holograms in which the entire image information of the hologram is present in each surface element. In the real configuration of the kinoform the relief profile calculated by means of computer is repeated on the element surfaces 9 (FIG. 5) through 11 (FIG. 5) or on the background area 31 (FIG. 6) in a regular raster grid whose raster areas 44 have typical dimensions in the range of between 0.5 mm and 10 mm, while details of the calculated relief profile subdivide the raster area into raster elements 45 whose typical dimensions are in the range of micrometers, preferably in the range of between 0.5 µm to 5 µm. For illumination purposes, the laser light source 41 is used, whose parallel light beam 40 produces a light spot 45 on the decorative foil 1, which completely lights up at least one raster area 44, for good image quality.

If the element surfaces 9 through 11 of the micromarking have the kinoform structure, then the concealed information upon illumination of the decorative foil 1 with the laser beam cannot be perfectly reconstructed on the screen if the surface proportion of all micromarkings occupies less than 5% of the area of the decorative foil 1. The large mirror proportion of the background area 31 results on the screen 43 in a bright mirror reflection in which the concealed information can only be weakly recognized. In addition the micromarking acts like a mask which is superimposed on the kinoform. At that mask, diffraction effects occur, the pattern thereof being superimposed on the reconstructed logo 42 and additionally blurring it.

It is advantageous therefore to select an embodiment of the decorative foil 1 in which the entire background area 31 is occupied by the raster areas 44 of the kinoform and the element surfaces 9 through 11 of the micromarkings have the mirror structure. With the naked eye the observer sees a slightly mattly shining decorative foil 1 which cannot be distinguished from a blank foil. Inspection with the magnifying glass 32 (FIG. 7) with oblique illumination reveals the micromarking. The concealed information is only visible on the screen 43 when the decorative foil 1 is illuminated with coherent light.

What is claimed is:

1. A decorative foil comprising at least a base foil and a reflection layer arranged on one side on the base foil, with a structure shaped in the base foil, characterized in that the structure obtained by shaping has recesses and/or raised portions arranged in groups, wherein the recesses and/or raised portions are shaped as cylinders, prisms, truncated cones, truncated pyramids or of a substantially rectangular or trapezoidal cross-section and as top surfaces have element surfaces, wherein the dimensions of the element surfaces are in the range of between 250 nm and 300 µm, a group surface occupied by the group is composed of the element surfaces and residual surfaces and the group surface is of a width of between 30 µm and 300 µm, the element surfaces of a group are in a parallel plane displaced with respect to a shaping surface and the residual surfaces are in the plane of the shaping surface, and the groups are separated by regions of a background area, which are in the plane of the shaping surface.

2. A decorative foil as set forth in claim 1 characterized in that a protective layer covers a structured side of the base foil having a reflection layer in such a way that the recesses of the structure in the base foil are filled and the reflection layer is enclosed between the base foil and the protective layer.

3. A decorative foil as set forth in claim 1 characterized in that the element surfaces of at least one group are delimited by contours of letters and/or characters and in the group surface represent a micromarking which can be recognized only with a magnifying glass.

4. A decorative foil as set forth in claim 3 characterized in that the micromarkings are arranged in text bands and the text bands form a guilloche pattern.

5. A decorative foil as set forth in claim 1 characterized in that the groups in the background area are arranged in a regularly repeating pattern.

6. A decorative foil as set forth in claim 5 characterized in that reflective surface portions of an optically variable diffraction pattern have the pattern of the groups in the background area.

7. A decorative foil as set forth in claim 1 characterized in that the distance between each of the parallel planes and the plane of the shaping surface is of a value in the range of between 0.05 µm and 10 µm.

8. A decorative foil as set forth in claim 1 characterized in that the element surfaces of at least one group are in the form of a mirror surface.

9. A decorative foil as set forth in claim 1 characterized in that the element surfaces of at least one group have a microscopically fine relief structure, wherein a mean height of the relief structure determines the position of the parallel plane.

10. A decorative foil as set forth in claim 9 characterized in that the relief structures in the case of at least two groups differ by an azimuthal preferential direction of the relief structures.

11. A decorative foil as set forth in claim 9 characterized in that the relief structure of the element surfaces in the case of at least one group is an isotropic matt structure.

12. A decorative foil as set forth in claim 9 characterized in that the relief structures in the case of at least two groups are anisotropic matt structures and that the azimuthal orientation of the anisotropic matt structure of the one group differs from the azimuthal orientation of the anisotropic matt structure of the other group.

13. A decorative foil as set forth in one in claim 8 characterized in that the background area surrounding the element surfaces is divided into raster surfaces and that at least one of the raster areas has the relief structure of a kinoform.

14. A decorative foil as set forth in claim 8 characterized in that the background area surrounding the element surfaces is a mirror.

15. A decorative foil as set forth in claim 2 characterized in that the reflection layer comprises one of the metals Al, Ag, Au, Cr, Cu, Pd, Ti or a transparent dielectric.

16. A decorative foil as set forth in claim 1 characterized in that the base foil is a laminate constructed from at least a base layer and a shaping layer and that the shaping layer is arranged between the reflection layer and the base layer.

17. A decorative foil as set forth in claim 1 characterized in that the base foil is transparent.

18. A decorative foil as set forth in claim 1 characterized in that the base foil has indicia applied by a printing process on at least one side.

19. A decorative foil as set forth in claim 2 characterized in that the base foil is a laminate constructed from at least a base layer and a shaping layer, the shaping layer is arranged between the reflection layer and the base layer and the base layer is a paper and the protective layer is transparent.

20. A decorative foil as set forth in claim 2 characterized in that the protective layer or an adhesive layer arranged on the side of the protective layer, which is remote from the reflection layer, is adapted for connection to a substrate.

21. A decorative foil as set forth in claim 20 characterized in that the base foil is connected to a transfer band on the side remote from the reflection layer by way of a separating layer.

22. A document having a decorative foil, wherein said decorative foil comprises at least a base foil and a reflection layer arranged on one side on the base foil, with a structure shaped in the base foil, characterized in that the structure obtained by shaping has recesses and/or raised portions arranged in groups, wherein the recesses and/or raised portions are shaped as cylinders, prisms, truncated cones, truncated pyramids or of a substantially rectangular or trapezoidal cross-section and as top surfaces have element surfaces, wherein the dimensions of the element surfaces are in the range of between 250 nm and 300 µm, a group surface occupied by the group is composed of the element surfaces and residual surfaces and the group surface is of a width of between 30 µm and 300 µm, the element surfaces of a group are in a parallel plane displaced with respect to a shaping surface and the residual surfaces are in the plane of the shaping surface, the groups are separated by regions of a background area, which are in the plane of the shaping surface, a protective layer covers a structured side of the base foil having a reflection layer in such a way that the recesses of the structure in the base foil are filled and the reflection layer is enclosed between the base foil and the protective layer and the protective layer or an adhesive layer arranged on the side of the protective layer, which is remote from the reflection layer, is adapted for connection to a substrate; and characterized in that the decorative foil covers a part of the substrate and is connected thereto by means of the adhesive layer.

* * * * *